(12) United States Patent
Holmberg et al.

(10) Patent No.: US 9,977,213 B2
(45) Date of Patent: *May 22, 2018

(54) SLIDABLE FIBER OPTIC CONNECTION MODULE WITH CABLE SLACK MANAGEMENT

(71) Applicant: CommScope Technologies LLC, Hickory, NC (US)

(72) Inventors: Matthew Holmberg, Le Center, MN (US); James J. Solheid, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/397,341

(22) Filed: Jan. 3, 2017

(65) Prior Publication Data
US 2017/0235078 A1    Aug. 17, 2017

Related U.S. Application Data

(63) Continuation of application No. 14/922,996, filed on Oct. 26, 2015, now Pat. No. 9,541,725, which is a
(Continued)

(51) Int. Cl.
*G02B 6/00* (2006.01)
*G02B 6/44* (2006.01)
*G02B 6/38* (2006.01)

(52) U.S. Cl.
CPC ......... *G02B 6/4455* (2013.01); *G02B 6/3897* (2013.01); *G02B 6/444* (2013.01); *G02B 6/4452* (2013.01); *G02B 6/4478* (2013.01)

(58) Field of Classification Search
CPC ................................................. G02B 6/4455
See application file for complete search history.

(56) References Cited

U.S. PATENT DOCUMENTS

| 2,805,106 A | 9/1957 | Penkala |
| 2,864,656 A | 12/1958 | Yorinks |

(Continued)

FOREIGN PATENT DOCUMENTS

| AU | 40995/85 | 4/1985 |
| AU | 55314/86 | 3/1986 |

(Continued)

OTHER PUBLICATIONS

"ITU Fiber Handbook" with English translation, 14 pages, Mar. 1992.
(Continued)

*Primary Examiner* — Rhonda Peace
(74) *Attorney, Agent, or Firm* — Merchant & Gould P.C.

(57) ABSTRACT

A fiber optic telecommunications device includes a frame and a fiber optic module. The fiber optic module includes a main housing portion defining fiber optic connection locations for connecting cables to be routed through the frame and a cable management portion for guiding cables between the main housing portion and the frame. The main housing portion of the fiber optic module is slidably mounted to the frame, the main housing portion slidable between a retracted position and an extended position in a sliding direction. The cable management portion of the fiber optic module includes a radius limiter slidably coupled to both the main housing portion and the frame, wherein movement of the main housing portion with respect to the frame slidably moves the radius limiter with respect to the main housing portion along the sliding direction.

13 Claims, 14 Drawing Sheets

Related U.S. Application Data continuation of application No. 13/645,674, filed on Oct. 5, 2012, now Pat. No. 9,170,391.

(60) Provisional application No. 61/544,965, filed on Oct. 7, 2011.

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Röck et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,717,810 A | 2/1998 | Wheeler |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,269,214 B1 | 7/2001 | Naudin et al. |
| 6,301,424 B1 | 10/2001 | Hwang |
| 6,360,050 B1 | 3/2002 | Moua et al. |
| 6,438,310 B1 | 8/2002 | Lance et al. |
| 6,439,523 B1 | 8/2002 | Chandler et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| RE38,311 E | 11/2003 | Wheeler |
| 6,677,520 B1 | 1/2004 | Kim et al. |
| 6,715,619 B2 | 4/2004 | Kim et al. |
| 6,748,155 B2 | 6/2004 | Kim et al. |
| 6,768,860 B2 | 7/2004 | Liberty |
| 6,804,447 B2 | 10/2004 | Smith et al. |
| 6,809,258 B1 | 10/2004 | Dang et al. |
| 6,810,193 B1 | 10/2004 | Müller |
| 6,845,208 B2 | 1/2005 | Thibault et al. |
| 6,865,331 B2 | 3/2005 | Mertesdorf |
| 6,925,241 B2 | 8/2005 | Bohle et al. |
| 6,934,457 B2 | 8/2005 | Vincent et al. |
| 6,945,620 B2 | 9/2005 | Lam et al. |
| 6,968,111 B2 | 11/2005 | Trebesch et al. |
| 7,006,748 B2 | 2/2006 | Dagley et al. |
| 7,068,907 B2 | 6/2006 | Schray |
| 7,079,744 B2 | 7/2006 | Douglas et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,367,823 B2 | 5/2008 | Rapp et al. |
| 7,373,071 B2 | 5/2008 | Douglas et al. |
| 7,406,240 B2 | 7/2008 | Murano |
| 7,409,137 B2 | 8/2008 | Barnes |
| 7,460,757 B2 | 12/2008 | Hoehne et al. |
| 7,463,811 B2 | 12/2008 | Trebesch et al. |
| 7,496,268 B2 | 2/2009 | Escoto et al. |
| 7,499,623 B2 | 3/2009 | Barnes et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 8,027,558 B2 | 9/2011 | Barnes et al. |
| 8,059,932 B2 | 11/2011 | Hill et al. |
| 8,078,030 B2 | 12/2011 | Trebesch et al. |
| 8,195,022 B2 | 6/2012 | Coburn et al. |
| 8,285,104 B2 | 10/2012 | Davis et al. |
| 8,452,149 B2 | 5/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |

(56) References Cited

U.S. PATENT DOCUMENTS

| | | |
|---|---|---|
| 8,690,593 B2 | 4/2014 | Anderson et al. |
| 9,170,391 B2 | 10/2015 | Holmberg |
| 9,541,725 B2 * | 1/2017 | Holmberg .............. G02B 6/444 |
| 2001/0001270 A1 | 5/2001 | Williams Vigliaturo |
| 2002/0181922 A1 | 12/2002 | Xin et al. |
| 2003/0007767 A1 | 1/2003 | Douglas et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0175090 A1 | 9/2004 | Vastmans et al. |
| 2004/0258384 A1 | 12/2004 | Trebesch et al. |
| 2005/0025444 A1 | 2/2005 | Barnes et al. |
| 2005/0058421 A1 | 3/2005 | Dagley |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2006/0275008 A1 | 12/2006 | Xin |
| 2007/0003204 A1 | 1/2007 | Makrides-Saravanos et al. |
| 2007/0031099 A1 | 2/2007 | Herzog et al. |
| 2007/0058918 A1 | 3/2007 | Trebesch et al. |
| 2007/0201806 A1 | 8/2007 | Douglas et al. |
| 2008/0063350 A1 | 3/2008 | Trebesch et al. |
| 2008/0175550 A1 | 7/2008 | Coburn et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0136196 A1 | 5/2009 | Trebesch et al. |
| 2009/0274430 A1 | 11/2009 | Krampotich et al. |
| 2009/0274431 A1 | 11/2009 | Krampotich et al. |
| 2010/0142910 A1 | 6/2010 | Hill et al. |
| 2010/0158465 A1 | 6/2010 | Smrha |
| 2010/0195968 A1 | 8/2010 | Trebesch et al. |
| 2010/0266253 A1 | 10/2010 | Krampotich et al. |
| 2010/0316346 A1 | 12/2010 | Krampotich et al. |
| 2010/0322578 A1 | 12/2010 | Cooke et al. |
| 2011/0188809 A1 | 8/2011 | LeBlanc et al. |
| 2011/0206336 A1 | 8/2011 | Krampotich et al. |
| 2011/0211799 A1 | 9/2011 | Conner et al. |
| 2011/0217016 A1 | 9/2011 | Mullsteff |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0057838 A1 | 3/2012 | Hill et al. |
| 2012/0093475 A1 | 4/2012 | Trebesch et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2013/0287356 A1 | 10/2013 | Solheid et al. |
| 2013/0287357 A1 | 10/2013 | Solheid et al. |
| 2014/0086545 A1 | 3/2014 | Solheid et al. |
| 2014/0133819 A1 | 5/2014 | Trebesch et al. |
| 2014/0241691 A1 | 8/2014 | Solheid et al. |
| 2017/0235078 A1 * | 8/2017 | Holmberg .............. G02B 6/444 385/135 |

FOREIGN PATENT DOCUMENTS

| | | |
|---|---|---|
| DE | 2735106 | 2/1979 |
| DE | 2918309 | 11/1980 |
| DE | 3308682 | 9/1984 |
| DE | 3836273 | 4/1990 |
| DE | 4413136 | 5/1995 |
| DE | 29504191 | 3/1996 |
| EP | 0146478 | 6/1985 |
| EP | 0149250 | 7/1985 |
| EP | 0356942 | 3/1990 |
| EP | 0406151 | 1/1991 |
| EP | 0464570 | 1/1992 |
| EP | 0479226 | 4/1992 |
| EP | 0196102 | 3/1993 |
| EP | 0538164 | 4/1993 |
| EP | 0563995 | 10/1999 |
| FR | 2531576 | 2/1984 |
| FR | 2587127 | 3/1987 |
| FR | 2678076 | 12/1992 |
| JP | 59-74523 | 4/1984 |
| JP | 60-169811 | 9/1985 |
| JP | 61-55607 | 3/1986 |
| JP | 61-90104 | 5/1986 |
| KR | 200337929 | 1/2004 |
| KR | 20080033420 | 4/2008 |
| WO | WO 91/10927 | 7/1991 |
| WO | WO 95/07480 | 3/1995 |
| WO | WO 96/10203 | 4/1996 |
| WO | WO 99/00619 | 1/1999 |
| WO | WO 03/005095 | 1/2003 |

OTHER PUBLICATIONS

"Precision Mechanical" with English translation, 5 pages.
Northern Telecom Bulletin #91-004, Issue #2, May 1991.
AT&T Product Bulletin 2987D-DLH-7/89, "High Density Interconnect System (HDIC)," Issue 2 (Copyright 1989).
Preface to the book "Structure, Installation, Connection and Protection of Communication Optical Fiber Cable," in Chinese with English Translation, 14 pages (Mar. 1992).
Complaint relating to Civil Action No. 5:11-cv-02509-JS, *ADC Telecommunications, Inc v. Opterna Am, Inc.* filed Apr. 11, 2011 (14 pages).
Complaint relating to Civil Action No. 1:11cv-735 (GBL-IDD), *ADC Telecommunications, Inc v. Opterna Am, Inc.* filed Jul. 12, 2011 (5 pages).
Plaintiff's Notice of Dismissal relating to Civil Action No. 5:11-cv-02509-JS, *ADC Telecommunications, Inc v. Opterna Am, Inc.* filed Jul. 12, 2011 (1 page).
Stipulation and Order of Dismissal relating to Civil Action No. 1:11-cv-735-GBL-IDD, *ADC Telecommunications, Inc v. Opterna Am, Inc.* filed Feb. 21, 2012 (2 pages).

* cited by examiner

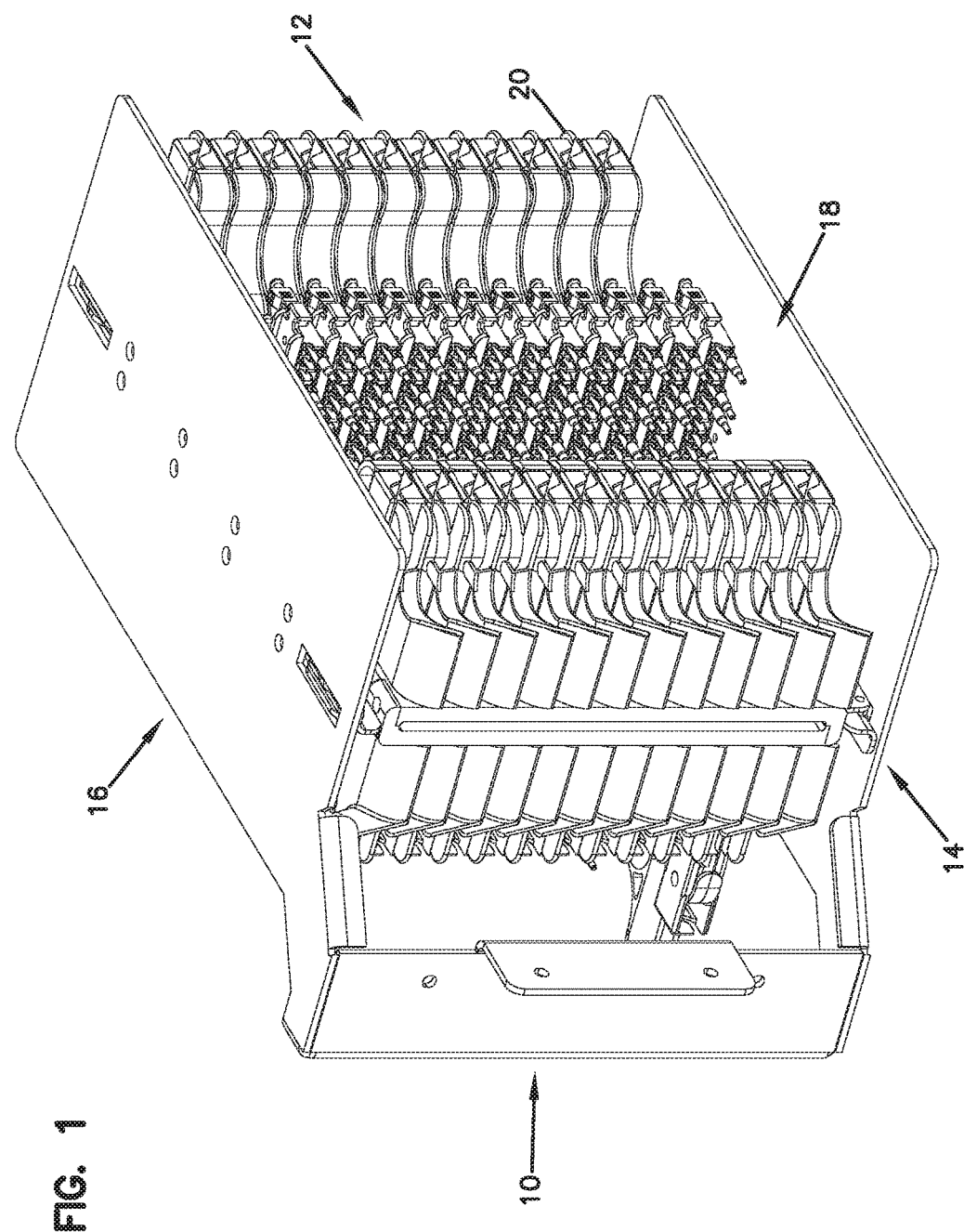

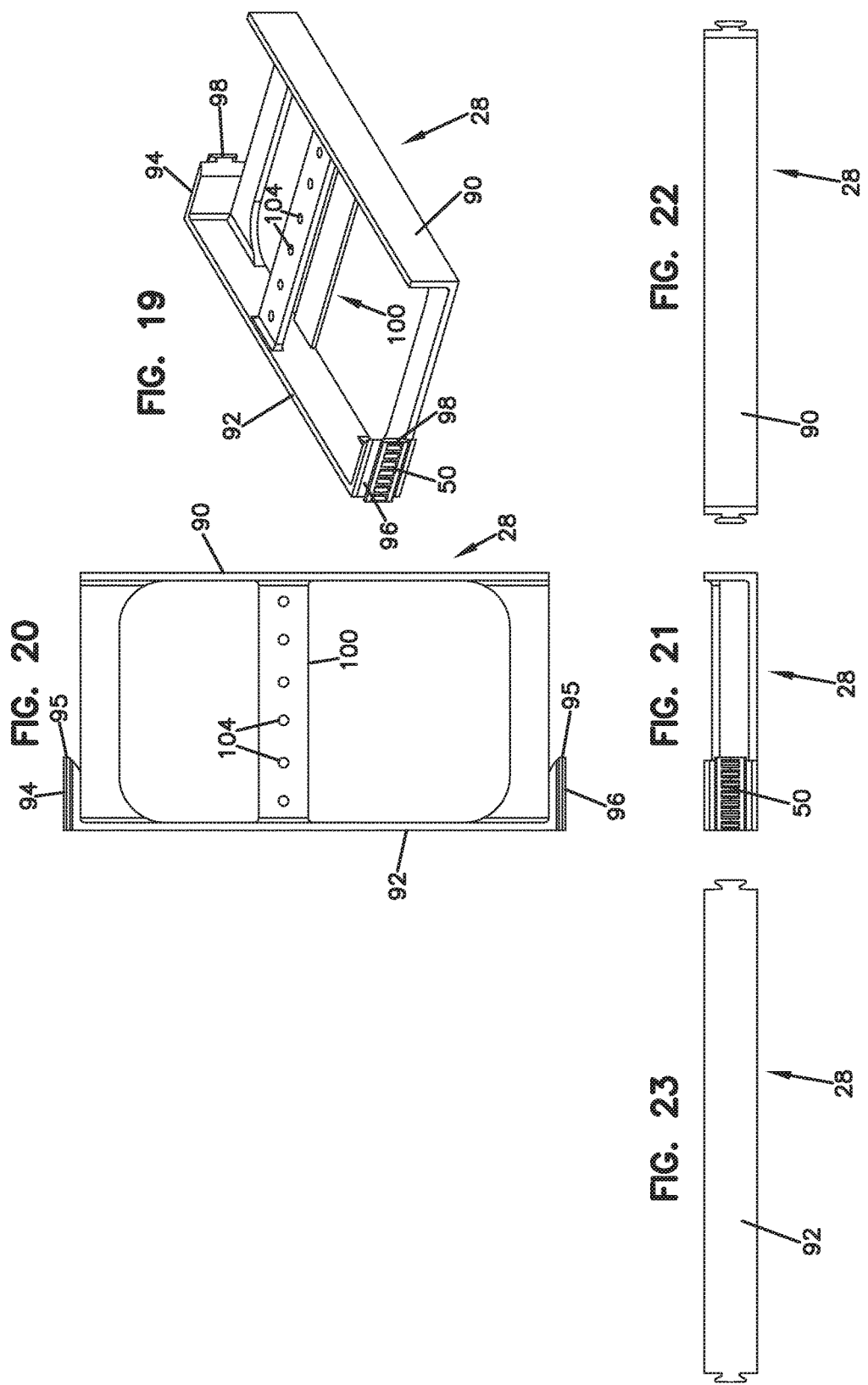

SLIDABLE FIBER OPTIC CONNECTION MODULE WITH CABLE SLACK MANAGEMENT

CROSS REFERENCE TO RELATED APPLICATIONS

This application is a continuation of U.S. patent application Ser. No. 14/922,996, filed Oct. 26, 2015, now U.S. Pat. No. 9,541,725, which is a continuation of U.S. patent application Ser. No. 13/645,674, filed Oct. 5, 2012, now U.S. Pat. No. 9,170,391, which claims the benefit of U.S. Provisional Patent Application Ser. No. 61/544,965, filed Oct. 7, 2011, which applications are hereby incorporated by reference in their entirety.

TECHNICAL FIELD

The present disclosure relates generally to fiber optic telecommunications equipment. More specifically, the present disclosure relates to a fiber optic module designed for high density applications.

BACKGROUND

In the telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

The present disclosure relates to a fiber optic telecommunications device. The telecommunications device includes a slidable fiber optic connection module with features for cable slack management.

According to one example embodiment, a fiber optic telecommunications device includes a frame and a fiber optic module. The fiber optic module includes a main housing portion defining fiber optic connection locations for connecting cables to be routed through the frame and a cable management portion for guiding cables between the main housing portion and the frame. The main housing portion of the fiber optic module is slidably mounted to the frame, the main housing portion slidable between a retracted position and an extended position along a sliding direction. The cable management portion of the fiber optic module includes a radius limiter slidably coupled to both the main housing portion and the frame, wherein movement of the main housing portion with respect to the frame slidably moves the radius limiter with respect to the main housing portion along the sliding direction.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a front perspective view of a high-density fiber distribution frame shown with a plurality of slidable fiber optic connection modules having features that are examples of inventive aspects in accordance with the principles of the present disclosure mounted in a stacked arrangement thereon;

FIG. 19 is a front, top perspective view of the main frame member of the connection module of FIG. 2, the main frame member shown without fiber optic adapters mounted thereon;

FIG. 20 is a top view of the main frame member of FIG. 19;

FIG. 21 is a left side view of the main frame member of FIG. 19;

FIG. 22 is a front view of the main frame member of FIG. 19;

FIG. 23 is a rear view of the main frame member of FIG. 19;

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1A:
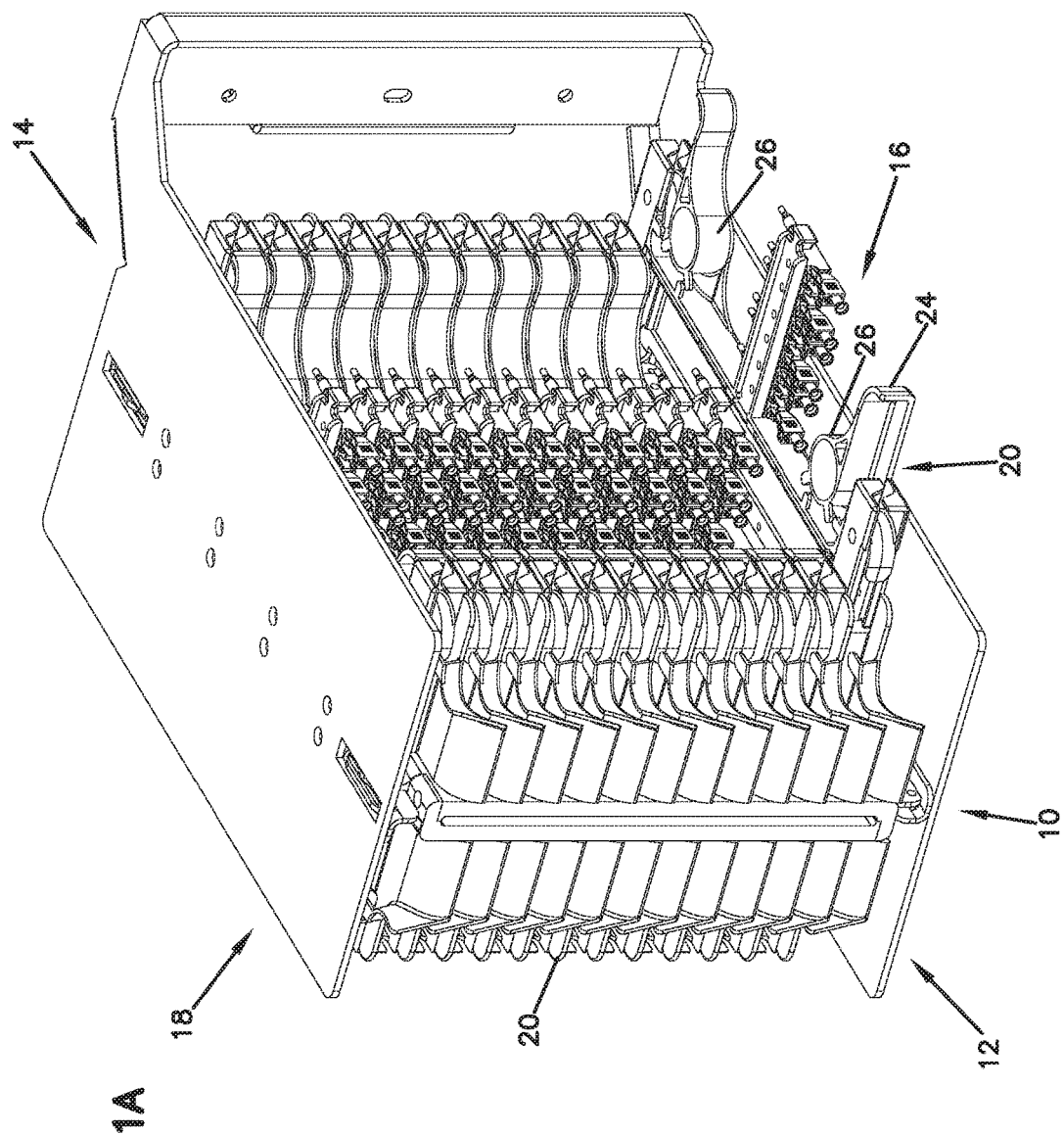
FIG. 1A illustrates one of the slidable fiber optic connection modules in an extended position.
Figure 2:
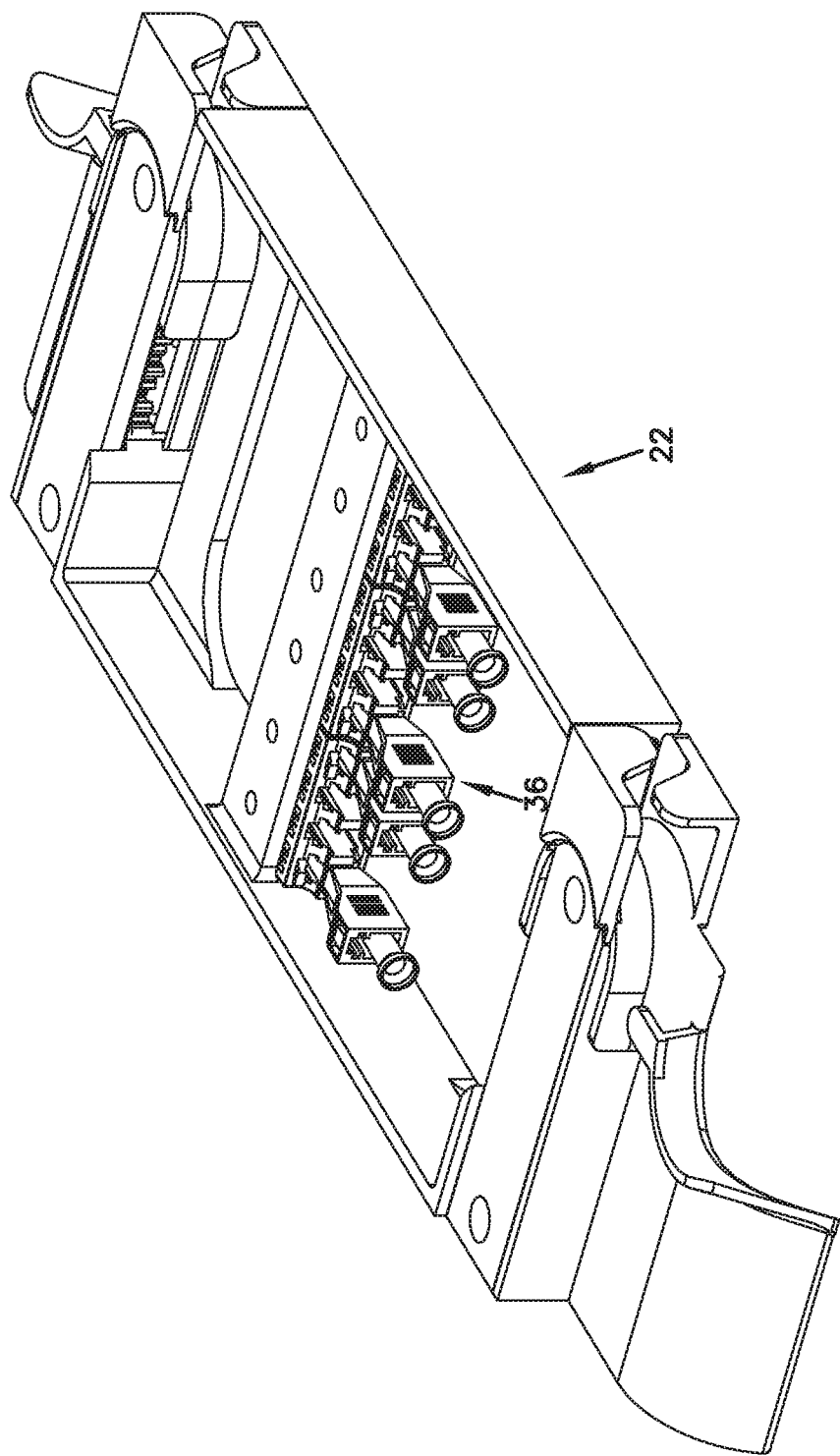
FIG. 2 is a front, top perspective view of a fiber optic connection module shown in isolation, the fiber optic connection module including similar features to those of the connection modules shown in FIG. 1, the connection module shown in a retracted position.
Figure 25:
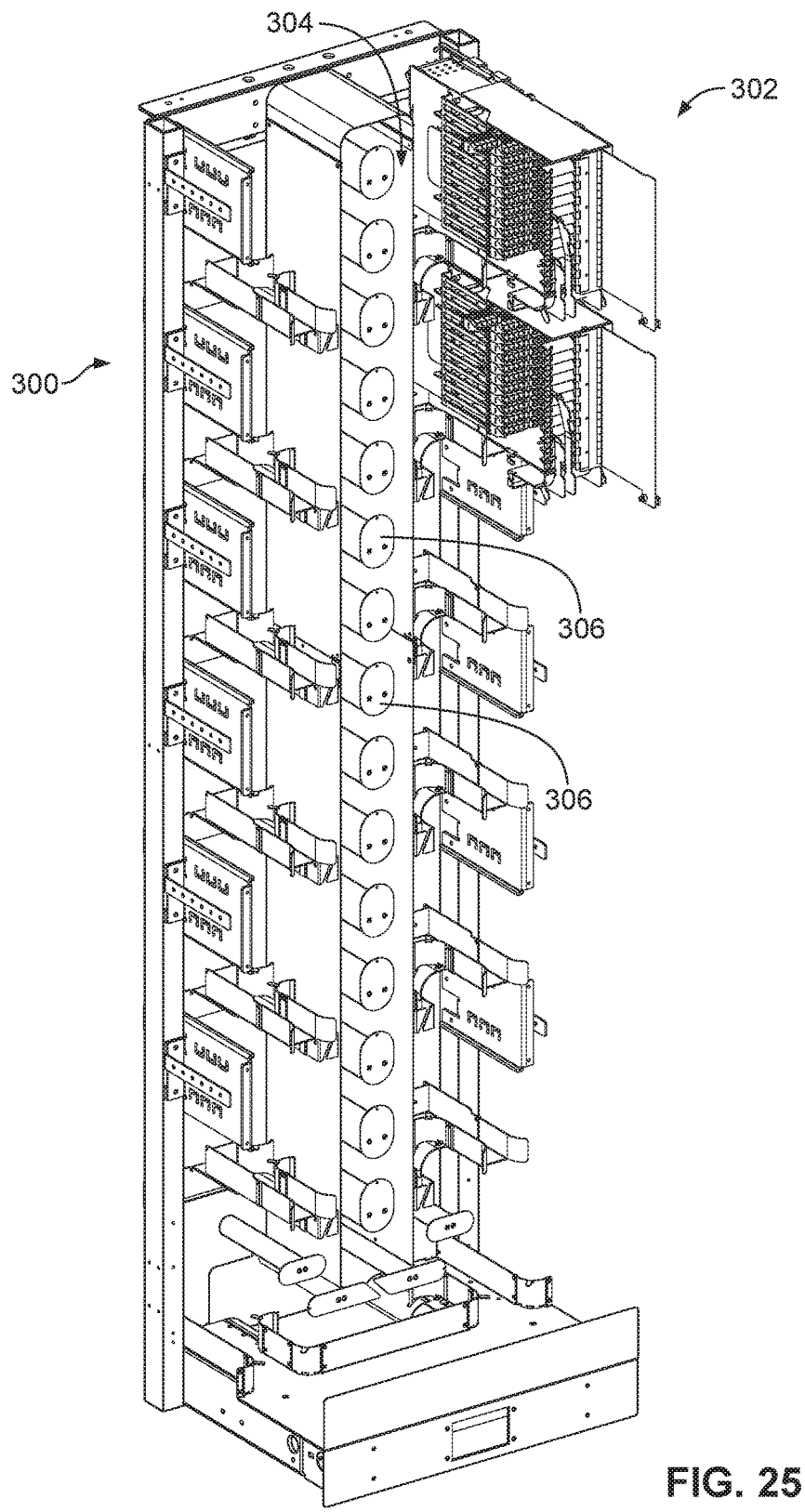
FIG. 25 illustrates a telecommunications rack with a plurality of prior art distribution frames or blocks mounted thereon.

A high-density distribution frame 10 is illustrated in FIGS. 1 and 1A. Similar high-density distribution frames or blocks are described in U.S. Pat. No. 6,591,051, the disclosure of which is incorporated by reference. It should be noted that the high-density fiber distribution frame 10 described herein may be used in a stacked arrangement in a telecommunications rack such as that described in U.S. Pat. No. 6,591,051, incorporated herein by reference in its entirety. Such a telecommunications rack 300 is also shown in FIG. 25 with a plurality of prior art distribution frames or blocks 302 mounted thereon in a stacked arrangement. The example rack defines a vertical cable path 304 with cable management structures 306 for leading cables away from and toward the distribution frames/blocks 302.

Referring to FIGS. 1 and 1A, the fiber distribution frame 10 defines a front side 12, a rear side 14, a right side 16, and a left side 18. The fiber distribution frame 10 includes a plurality of fiber optic connection modules 20 mounted thereon in a stacked arrangement adjacent both the right side 16 and the left side 18. As will be described in further detail below, each of the connection modules 20 is separately slidable with respect to the frame 10 between a retracted position and an extended position for the purpose of accessing the fiber optic equipment located in or on the modules 20. The connection modules 20 on the right side 16 are slidably extendable in a direction from the left toward the right, and the connection modules 20 on the left side 18 are slidably extendable in a direction from the right toward the left side of the distribution frame 10.

Referring to FIGS. 2-8, a fiber optic connection module 22 having features similar to those modules 20 of FIGS. 1 and 1A is shown in isolation. The connection module 22 is shown in isolation in a retracted position in FIGS. 2 and 3 and is shown in a fully extended position in FIGS. 4, 5, 7, and 8.

As will be discussed, the connection module 22 shown in FIGS. 2-8 is similar to those shown in FIGS. 1 and 1A, except that the connection modules 20 shown in FIGS. 1 and 1A do not include a front wall of the main frame member 24 and also include a cable management spool 26 on each of the right and left sides of the module 20. The version of the module 22 shown in FIGS. 2-8 does not include cable management spools on the main frame member 28 but can certainly be modified to do so. It should be noted that the operation and the functionality of both of the versions of the connection modules 20, 22 (FIGS. 1 and 1A and FIGS. 2-8) are very similar.

Although the connection modules 20, 22 are shown and described as being mounted on a fiber distribution frame 10 such as that shown in FIGS. 1 and 1A, it should be noted that the distribution frame 10 is only one example of a piece of fiber optic equipment to which modules such as modules 20 and 22 may be mounted.

Referring now to the version of the module 22 shown in FIGS. 2-8, as shown, the connection module 22 utilizes a slide assembly 30 including a rack and pinion arrangement allowing the connection module 22 to be slidable between the retracted and extended positions. As will be discussed in further detail below, by using a three-piece slide assembly 30, wherein a center member 32 moves with respect to both the main frame member 28 and a rack mount member 34 of the connection module 22, the module 22 is configured to manage the slack in the cable routed through the module 22. The slide assembly 30 is configured such that when the connection module 22 is moved to the extended position, cables extending from the main frame 28 all the way to the rack mount members 34 maintain the same length and are not stressed or pulled during the travel of the main frame member 28. Also, the slide assembly 30 is configured such that, when the connection module 22 is moved from the extended position to the retracted position, the slide assembly 30 allows cable management features located on different parts of the module 22 to relatively move with respect to each other, providing management of any slack in the cable.

Still referring to FIGS. 2-8, as discussed, the connection module 22 includes a main frame member 28. The main frame member 28 is configured to provide connection locations 36 for the module 22. At each of the right and left sides 38, 40 thereof, the main frame member 28 is slidably connected to right and left center members 32, which are in turn slidably connected to right and left rack mount members 34 of the slide assembly 30. As will be discussed in further detail below, the rack and pinion arrangement of the slide assembly 30 is configured such that it provides synchronized slidable movement of the center members 32 and the main frame member 28 when the rear rack mount members 34 are held stationary (for example, mounted to a distribution frame 10). As such, the slide assembly 30 provides synchronized slidable movement for radius limiters located on the center members 32 relative to the main frame member 28. The synchronized movement of the radius limiters of the center members 32 and the main frame member 28 ensures that cables routed from the connection locations 36 of the main frame member 28 do not bend too sharply when the main frame member 28 is being extended or retracted. If the cables were to bend too sharply or if the cables were stressed or pulled, loss of signal strength or loss of transmission may occur.

Figure 7:
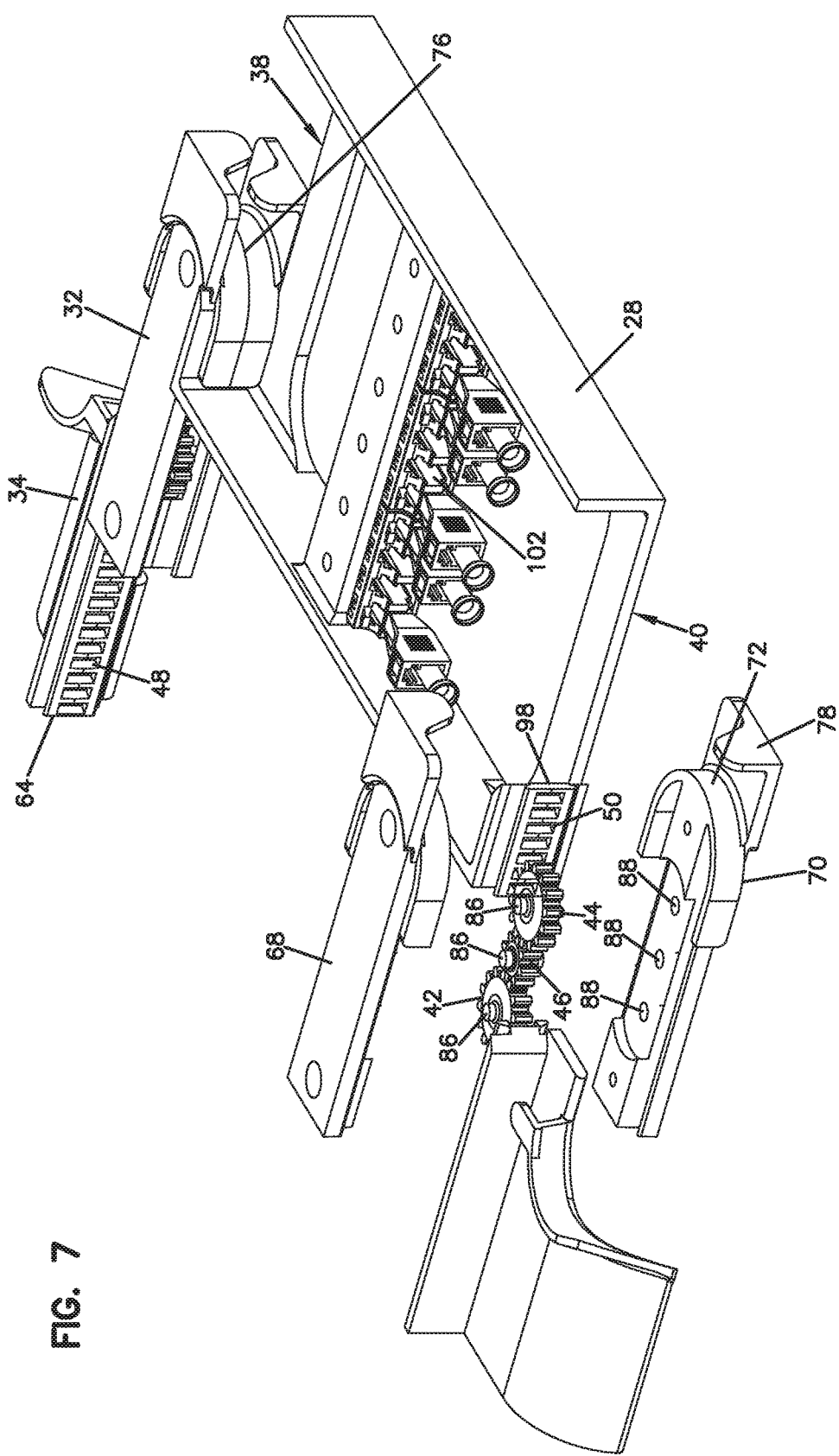
FIG. 7 is a front, top perspective view of the connection module of FIG. 2, with the left center slide member of the module shown in an exploded view.
Figure 8:
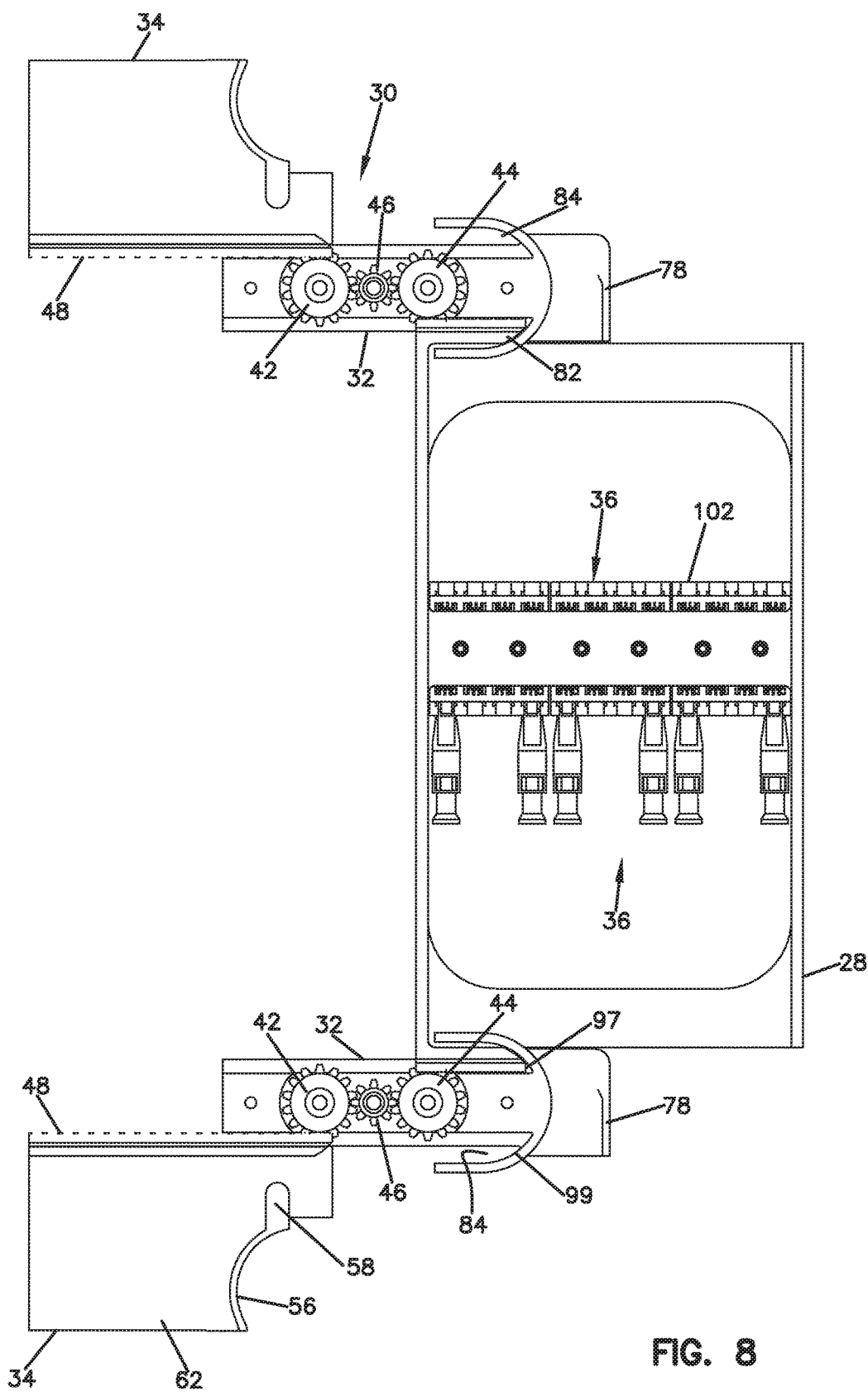
FIG. 8 is a top view of the connection module of FIG. 2, with the upper halves of the center slide members removed to illustrate the gear teeth therein.
Figure 10:
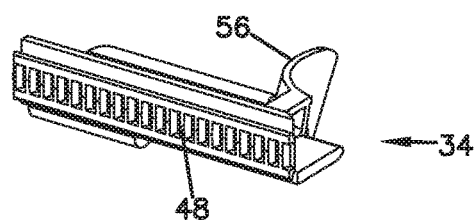
FIG. 10 is a rear, top perspective view of the rack mount member of FIG. 9.
Figure 9:
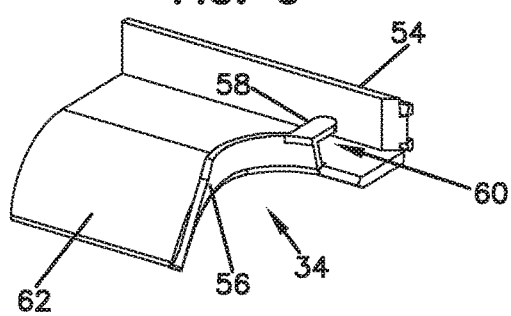
FIG. 9 is a front, top perspective view of the left rack mount member of the slide assembly of the connection module of FIG. 2, the right rack mount member including similar features to that of the left rack mount member.
Figure 12:
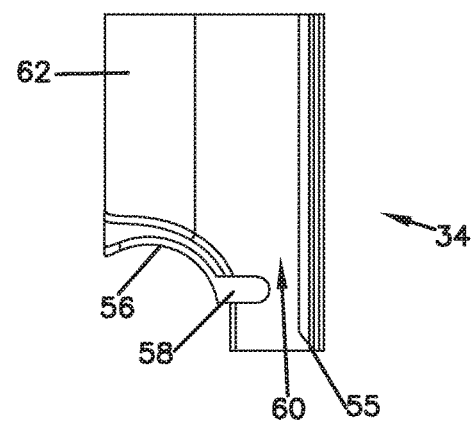
FIG. 12 is a top view of the rack mount member of FIG. 9.
Figure 11:
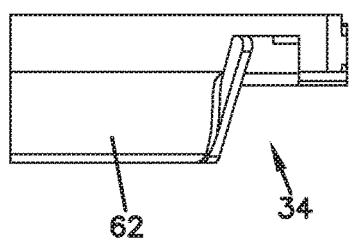
FIG. 11 is a left side view of the rack mount member of FIG. 9.
Figure 14:
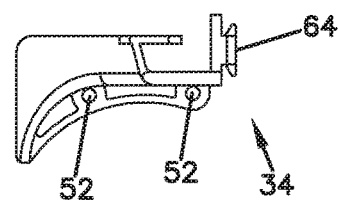
FIG. 14 is a front view of the rack mount member of FIG. 9.
Figure 13:
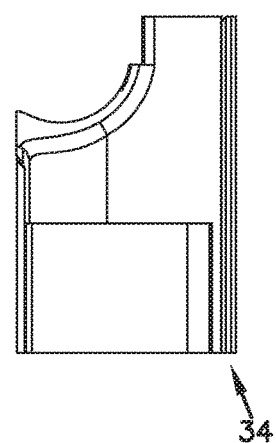
FIG. 13 is a bottom view of the rack mount member of FIG. 9.
Figure 15:
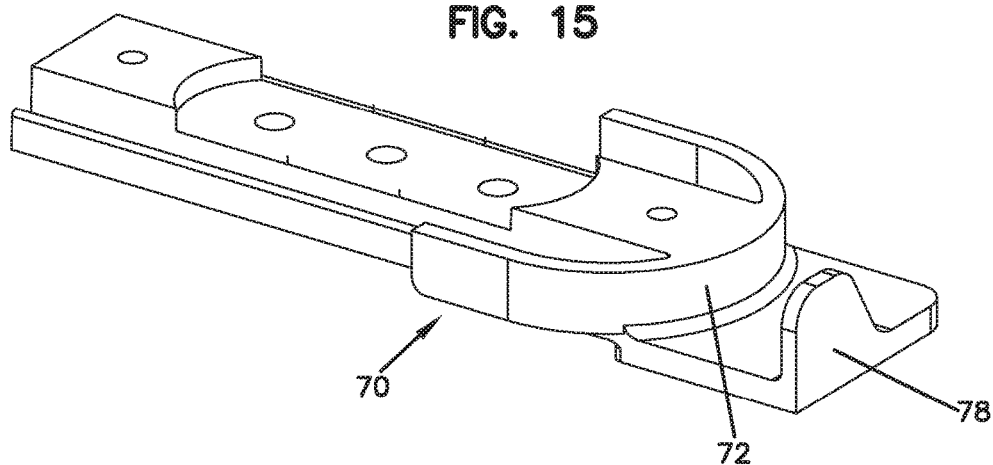
FIG. 15 is a front, top perspective view of the lower half of a center slide member of the connection module of FIG. 2, the upper half of the center slide member including similar features to that of the lower half.
Figure 16:
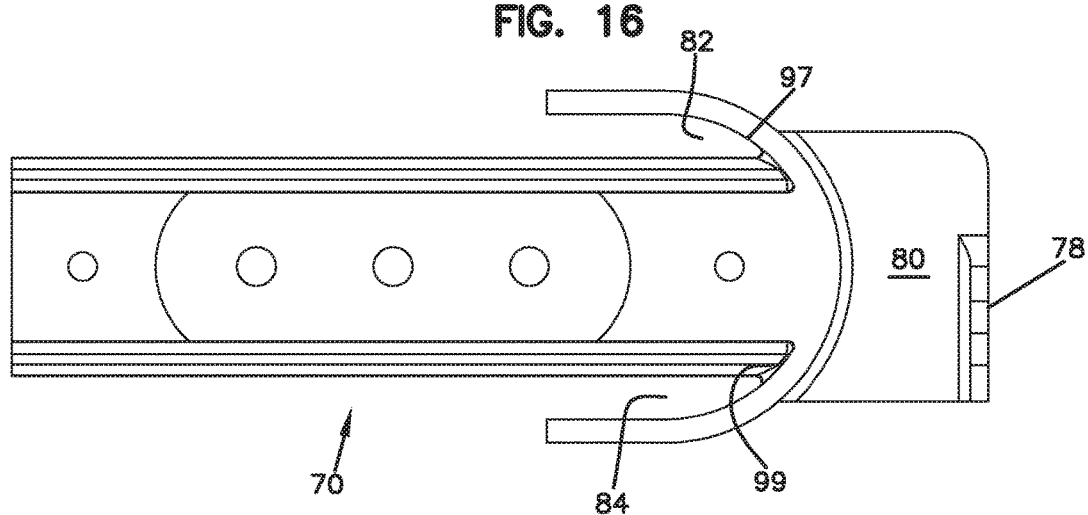
FIG. 16 is a top view of the lower half of the center slide member of FIG. 15.
Figure 17:
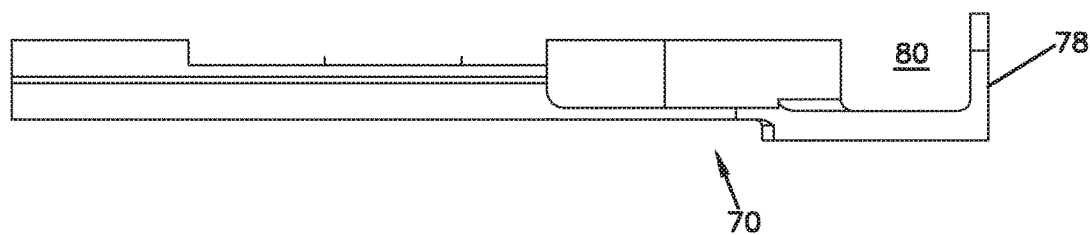
FIG. 17 is a side view of the lower half of the center slide member of FIG. 15.
Figure 18:
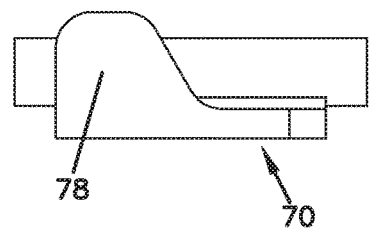
FIG. 18 is a front view of the lower half of the center slide member of FIG. 15.

Referring specifically to FIGS. 7 and 8, each center member 32 includes a first gear 42, a second gear 44, and an idler gear 46 thereinbetween. The idler gear 46 meshes with the first and second gears 42, 44 and is configured to transmit the rotational direction of the first gear 42 to the second gear 44 such that the first and second gears 42, 44 rotate in the same direction. The first and second gears 42, 44 mesh with a first rack 48 provided on each of the rack mount members 34 and a second rack 50 provided on each of the right and left sides 38, 40 of the main frame member 28. The first, second, and idler gears 42, 44, 46 are configured to provide half speed linear movement for the center members 32 by rotational contact with both the first and second racks 48, 50. That is, when the main frame member 28 is slid relative to the rack mount members 34 (or the fiber distribution frame 10), the first gear 42, the second gear 44, and the idler gear 46 rotate between the first and second racks 48, 50 to permit the main frame member 28 to travel at full speed and to cause the center members 32 (and thus, the radius limiters of the center members 32) to travel at half speed.

When the main frame member 28 is extended away from the distribution frame 10, the second rack 50 contacts and rotates initially the first gear 42 and then the second gear 44 located on the center members 32. While the first gear 42 is rotating, the first gear 42 simultaneously contacts the first rack 48 on each of the rack mount members 34. This coupling starts to move each center member 32 with respect to both the main frame member 28 and each rack mount member 34, with the center member 32 moving at half the linear speed of the main frame member 28 with respect to the stationary rack mount member 34. By the time the second rack 50 reaches the second gear 44 of the center member 32, the first rack 48 of the rack mount member 34 is only contacting the first gear 42 of the center member 32. As noted before, during the movement of the slide assembly 30, both the first and second gears 42, 44 are rotating simultaneously in the same direction via the idler gear 46, which is rotating in the opposite direction. When the connection module 22 is moved toward the retracted position, the movements of the gears 42, 44, 46 of the slide assembly 30 are reversed.

Referring now to FIGS. 9-14, one of the rack mount members 34 (left rack mount member) of the slide assembly 30 is shown. It should be noted that features discussed with respect to the left rack mount member are fully applicable to the right rack mount member and only one of the rack mount members 34 will be discussed herein for ease of description.

The rack mount member 34 includes mounting holes 52 for receiving fasteners for mounting the connection module 22 to telecommunications equipment such as the high distribution frame 10 shown in FIGS. 1 and 1A. The rack mount member 34 of the slide assembly 30 is the part of the module 22 that stays stationary with respect to the rest of the module 22. As discussed above, each center member 32 and the main frame member 28 move with respect to the rack mount member 34 when the connection module 22 is extended or retracted.

The rack mount member 34 includes a divider wall 54 and a radius limiter 56 with a cable management finger 58. The divider wall 54 and the radius limiter 56 cooperatively define a cable path 60 for cables coming from the center member 32. The cables that are routed around the radius limiter of the center member 32 enter the cable path 60, pass underneath the cable management finger 58 and are lead down a ramp 62 for connection to further fiber optic equipment.

Figure 3:
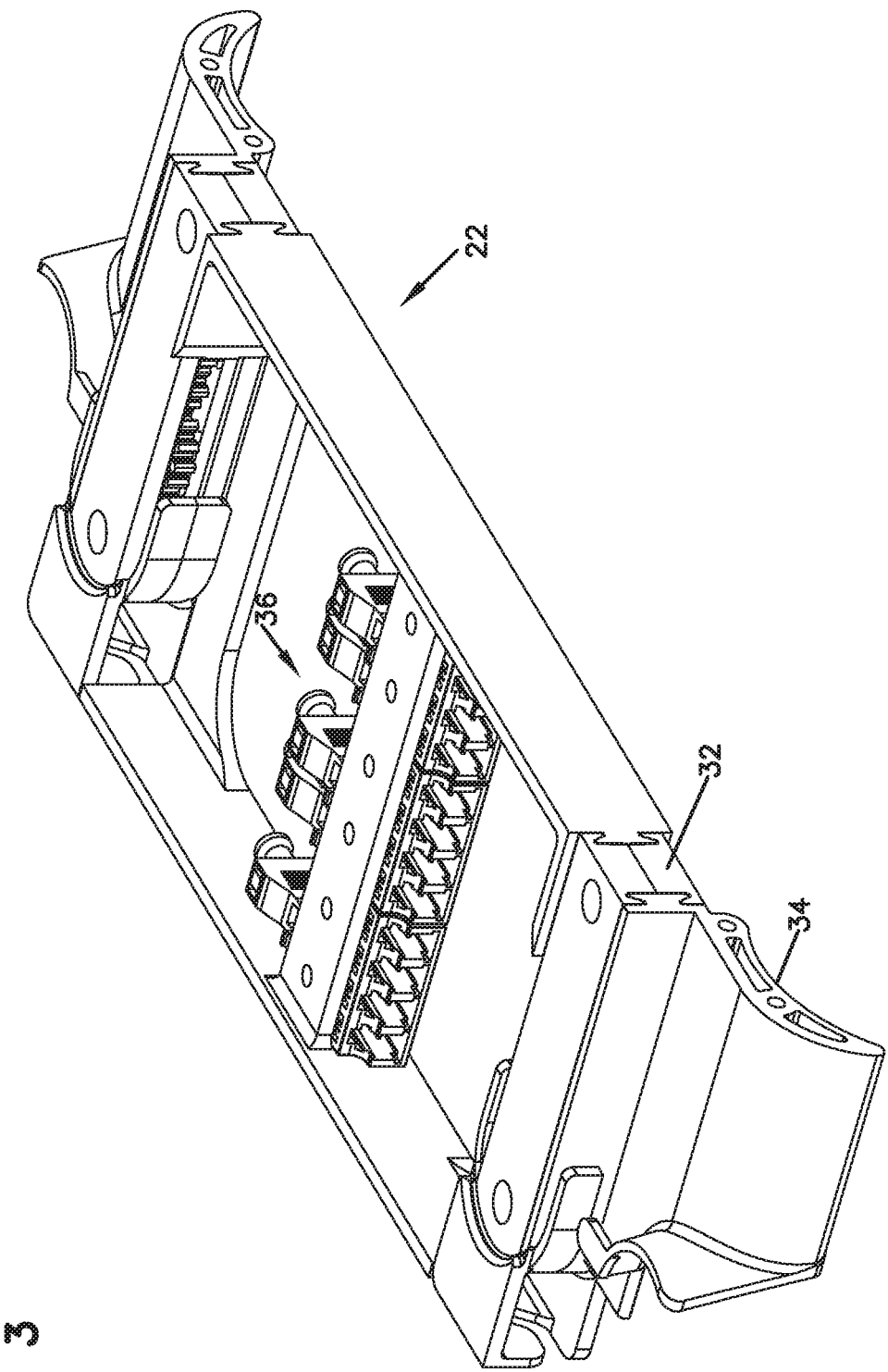
FIG. 3 is a rear, top perspective view of the fiber optic connection module of FIG. 2.
Figure 4:
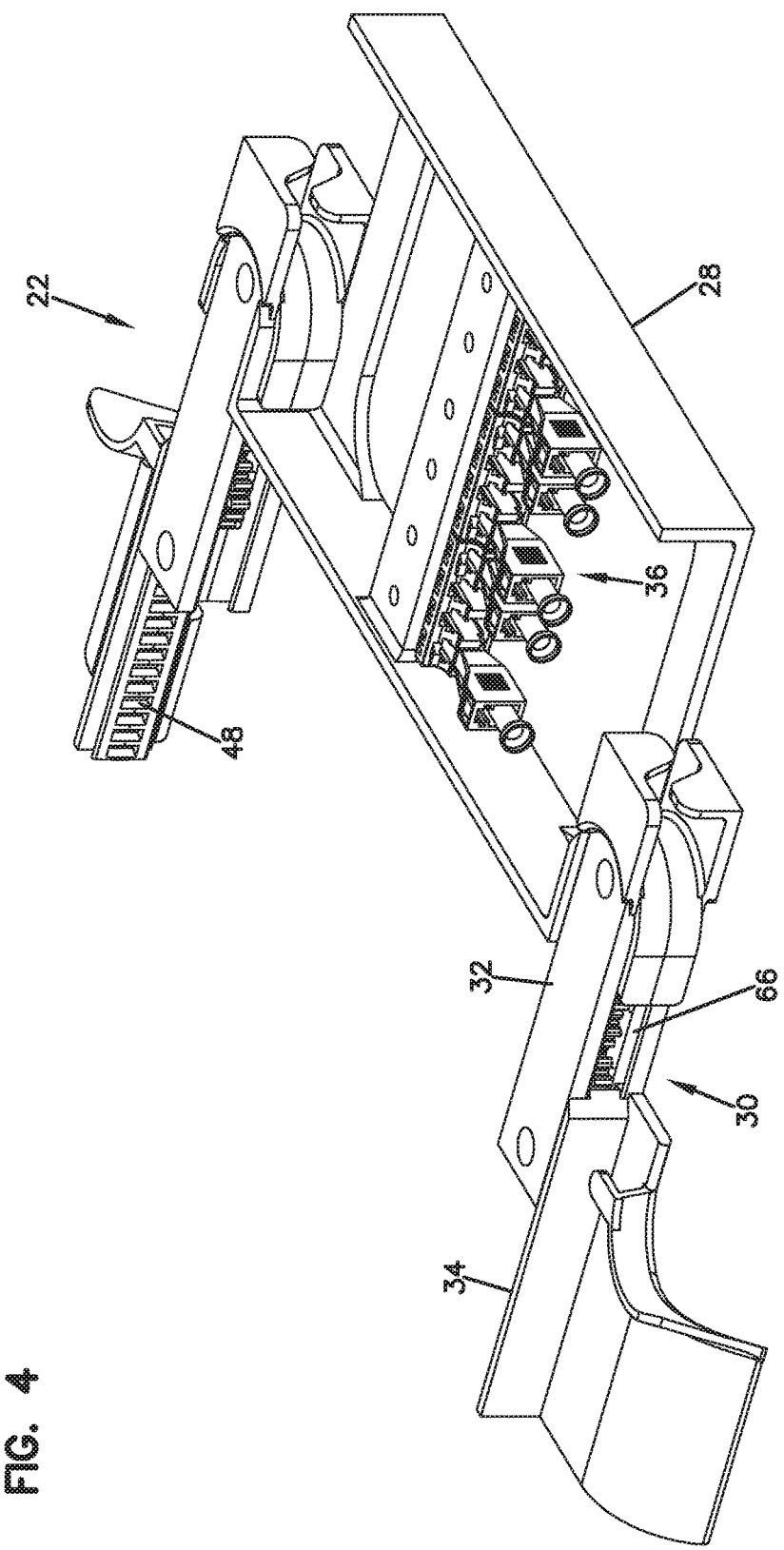
FIG. 4 illustrates the fiber optic connection module of FIG. 2 in a fully extended position.
Figure 5:
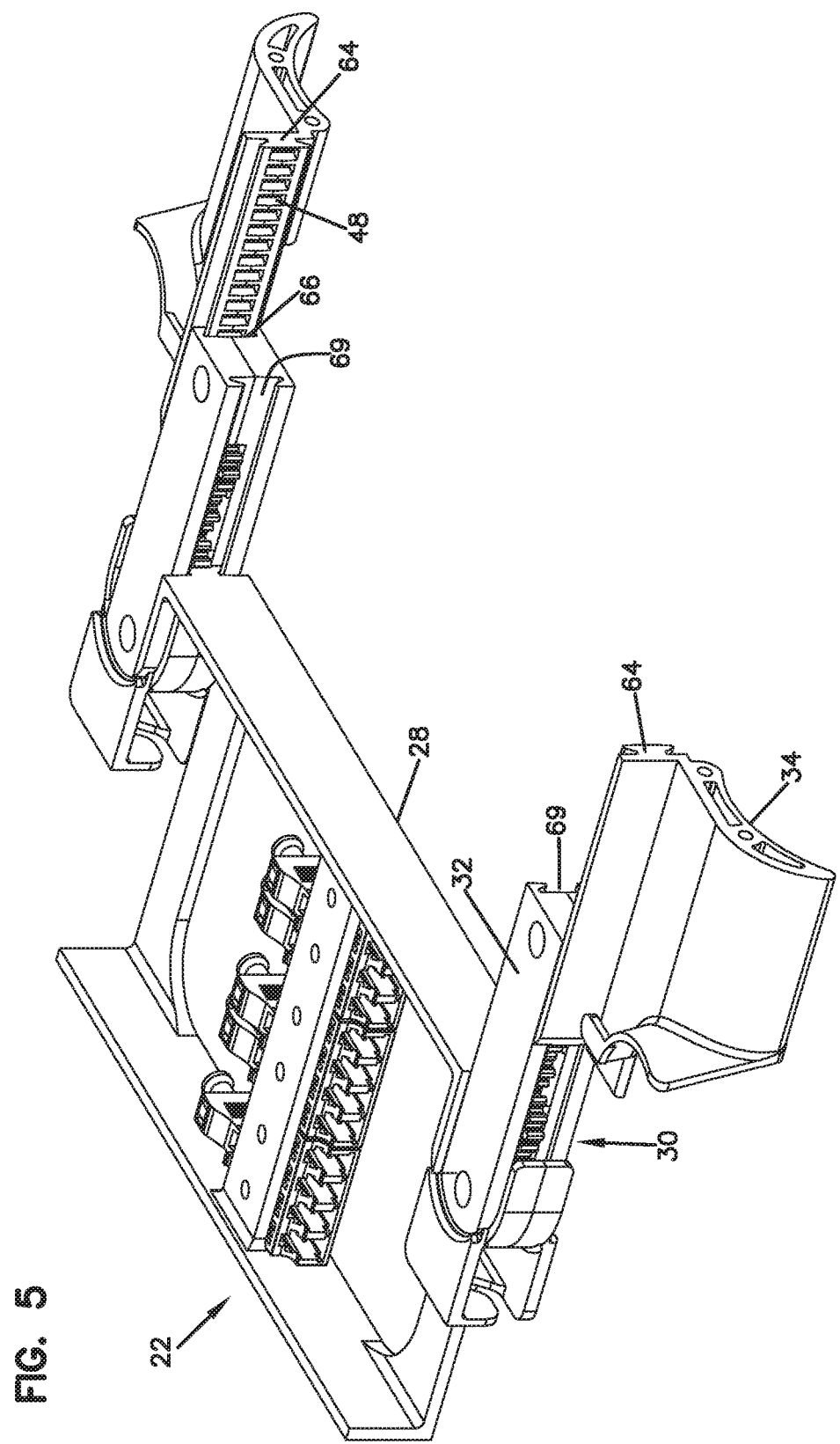
FIG. 5 illustrates the fiber optic connection module of FIG. 3 in a fully extended position.
Figure 6:
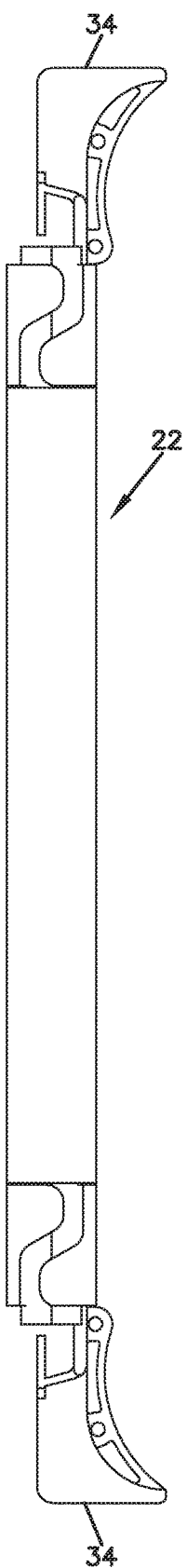
FIG. 6 is a front view of the fiber optic connection module of FIG. 2.

On the divider wall 54, on the side opposite from the cable path 60, the rack mount member 34 defines a first longitudinal protrusion 64 that extends from the front to the rear of the rack mount member 34. The longitudinal protrusion 64 defines a dovetail shaped profile for slidable insertion into a first dovetail shaped longitudinal groove 66 of the center member 32 as shown in FIGS. 3 and 4. The dovetail shaped profiles provide for longitudinal slidable coupling between each rack mount member 34 and center member 32 while preventing uncoupling of the two members in a direction perpendicular to the sliding direction.

The longitudinal protrusion 64 of each rack mount member 34 also defines the first rack 48. As discussed previously, by meshing with both the first rack 48 on the rack mount member 34 and the second rack 50 on the main frame member 28 at the same time, the first and second gears 42, 44 located on the center member 32 allow the center member 32 to move simultaneously with the main frame member 28 but at half the linear speed of the main frame member 28.

Referring now to FIG. 7, one of the center members 32 of the slide assembly 30 of the connection module 22 is shown in an exploded configuration, wherein the upper and lower halves 68, 70 of the center member 32 have been separated to expose the gears 42, 44, 46 therein. FIG. 8 also illustrates each of the center members 32 with the upper halves 68 removed, showing the meshing of the first and second gear teeth with the first and second racks 48, 50 and also showing the idler gear 46 meshing with each of the first and second gears 42, 44 to maintain the rotational direction between those two gears 42, 44.

The lower half 70 of one of the center members 32 is shown in isolation in FIGS. 15-18. It should be noted that although only the lower half 70 is shown and described herein, all of the features with respect to the lower half 70 are also shared by the upper half 68 of the center member 32 and will not be separately discussed. Each of the upper and lower halves 68, 70 of the center member 32, as shown in FIGS. 4, 5, 7, and 8, define a radius limiter 72 adjacent the front of the center member 32. When the upper and the lower halves 68, 70 are mounted together with fasteners through fastener openings 74, the radius limiters 72 align to form a single radius limiter 76 located adjacent the front of the center member 32. In cooperation with a cable management finger 78 that extends upwardly from the lower half 70 and one that extends downwardly from the upper half 68, the radius limiter 76 of the center member 32 defines a cable path 80 for cables extending from connection locations 36 of the main frame member 28. Once cables extend from the main frame member 28 and around the radius limiter 76, passing through the cable path 60 of the center member 32, they are led to the cable path 80 defined by the rack mount member 34.

The radius limiter 76 of each center member 32 defines a first notch 82 and a second notch 84. As will be discussed in further detail below, the notches 82, 84 accommodate portions of the rack mount members 34 and also portions of the main frame member 28 in providing stop points during extension and retraction of the connection module 22.

The first, second, and idler gears 42, 44, 46 are placed within each center member 32 via axial pins 86 defined on each gear and openings 88 defined on each of the lower and upper halves 70, 68 of the center member 32. Once the gears 42, 44, 46 are placed within the openings 88 of the lower half 70, the upper half 68 is fastened down to the lower half 70, and the gears 42, 44, 46 are free to spin when they are not engaging either of the racks 48, 50.

When the main frame member 28 is pulled out with respect to the distribution frame 10 or the rack mount members 34, the center member 32 (by the meshing of the gear teeth of the first and second gears 42, 44 with the first and second racks 48, 50) moves in the same direction with the main frame member 28 at half the linear speed of the main frame member 28.

In this manner, cables extending from the main frame member 28 (for example around the rear part of the spool 26 shown in FIG. 1) to the center member 32 and around the radius limiter 76 of the center member 32 are able to maintain a generally uniform length throughout the travel of the main frame member 28. Thus, cables extending from the main frame member 28 all the way to the rack mount members 34 are not stressed or pulled during the travel of the main frame member 28. Also, as noted above, when the connection module 22 is moved from the extended position to the retracted position, the cables maintain their length and any slack in the cables is managed. The maintenance of the cable slack limits any pinching that might occur with fiber optic equipment if there was excessive slack during the retraction of the module 22.

When the upper and the lower halves 68, 70 of the center member 32 are fastened together, they also cooperatively define the first dovetail shaped longitudinal groove 66 formed on the left side of the center member and a second dovetail shaped longitudinal groove 69 formed on the right side of the center member 32.

As noted above, FIGS. 19-23 illustrate one version of the main frame member 28, while a second version 24 is illustrated in FIGS. 1 and 1A. The main frame member 28 shown in FIGS. 19-23 is similar to those shown in FIGS. 1 and 1A, except that the main frame member 24 shown in FIGS. 1 and 1A does not include a front wall and also includes a cable management spool 26 on each of the right and left sides of the member 24, wherein such spools are not shown for the version 28 in FIGS. 19-23. It should be noted, however, that the features shown in FIGS. 1 and 1A can be included in the version shown in FIGS. 19-23 and vice versa, and that the operation and functionality of both of the versions are very similar.

Referring to FIGS. 19-23, the main frame member 28 includes a front wall 90, a rear wall 92, a right sidewall 94, and a left sidewall 96. Each of the right and left sidewalls 94, 96 defines a longitudinal protrusion 98 similar to that of the rack mount members 34 for slidable coupling with the center member 32. Each of the longitudinal protrusions 98 of the right wall 94 and the left wall 96 defines a dovetail shaped profile for slidable insertion into the second dovetail shaped longitudinal groove 69 of the center member 32 as shown in FIGS. 3 and 8. The dovetail shaped profiles provide for longitudinal slidable coupling between each center member 32 and the main frame member 28 while preventing uncoupling of the two members in a direction perpendicular to the sliding direction.

The longitudinal protrusion 98 on each of the right and left sidewalls 94, 96 of the main frame member 28 also defines the second rack 50. As discussed previously, by meshing with both the first rack 48 on the rack mount member 34 and the second rack 50 on the main frame member 28 at the same time, the first and second gears 42, 44 located on the center member 32 allow the center member 32 to move at half linear speed simultaneously with the main frame member 28.

When the main frame member 28 is fully extended, the front end 95 of each of the right sidewall 94 and the left sidewall 96 contacts an end 97 of the first notch 82 defined by the radius limiter 76 of each of the center members 32. Similarly, a front end 55 of the divider wall 54 of each rack mount member 34 also contacts an end 99 of the second notch 84 defined by the radius limiter 76 of each of the center members 32 when the connection module 22 is brought to the fully retracted position. In this manner, positive stops are provided for full extension and retraction of the modules 22.

The main frame member 28 is configured to provide fiber optic connection locations 36 for the connection module 22. By stacking a plurality of the modules 22 on a distribution frame 10, density of connections for fiber optic transmission can be increased, and the slidability of the modules 22 provides for easy access. As shown in FIGS. 19-23, the depicted version of the main frame member 28 includes a mount 100 for mounting fiber optic adapters 102 which define the fiber optic connection locations 36 in this embodiment of the module 22. Specifically, in the module 22 shown and described in the present application, the fiber optic connection locations 36 are defined by adapters 102 having an LC type footprint. In the depicted embodiments, twelve LC adapters 102 are mounted to the mount 100 via fasteners through fastener openings 104 defined on the mount 100. In the high density distribution frame 10 shown in FIGS. 1 and 1A, twelve slidable modules are mounted on each of right and left sides of the frame 10.

It should be noted that other standards of fiber optic adapters 102 (such as SC adapters) can be mounted to the mount 100. Fiber optic adapters 102 are only one type of fiber optic equipment that provides connection locations 36 for the module 22, and the module 22 can be used with other types of fiber optic equipment. For example, equipment such as fiber optic splitters, couplers, multiplexers/demultiplexers, or other types of equipment wherein cables may be routed away from the connection locations may be housed on the main frame member 28.

If fiber optic adapters are used, the connection locations may be defined by adapters individually mounted in the mount or may be defined by blocks that include integrally formed adapters. In other embodiments, the connection locations may be in the form of a cassette that includes fiber optic adapters on one side, wherein the opposite side either has a multi-fiber connector or a cable extending outwardly therefrom, as described in further detail in U.S. Publication No. 2013/0089292, incorporated herein by reference in its entirety.

As long as plurality of fiber optic cables or even a single fiber optic cable is being routed from the main frame member 28 all the way to the rack mount members 34, the slide assembly 30 of the module 22 provides access to those fiber optic terminations while managing the cable slack to prevent pinching and preventing pulling or stressing of the cables.

Figure 24:
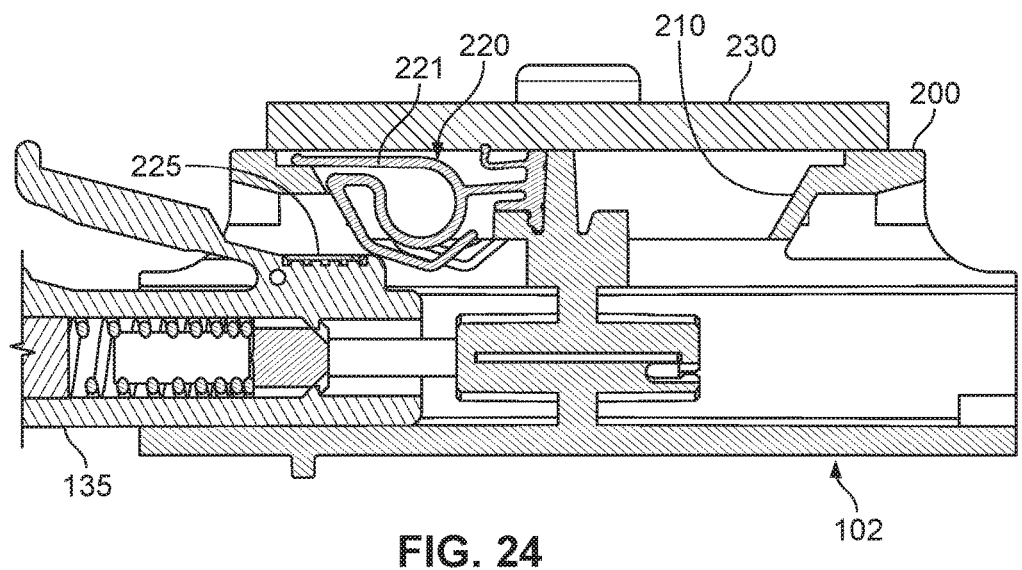
FIG. 24 is a cross-sectional view of an example adapter having a media reading interface configured to collect information stored in memory disposed on a fiber optic connector.

In accordance with some aspects, certain types of adapters 102 may be configured to collect physical layer information from one or more fiber optic connectors 135 received thereat. For example, as shown in FIG. 24, certain types of adapter modules 102 may include a body 200 configured to hold one or more media reading interfaces 220 that are configured to engage memory contacts on the fiber optic connectors 135. One or more media reading interfaces 220 may be positioned in the adapter body 200. In certain implementations, the adapter body 200 defines slots 210 extending between an exterior of the adapter body 200 and an internal passage in which the ferrules of the connectors 135 are received.

Certain types of media reading interfaces 220 include one or more contact members 221 that are positioned in the slots 210. As shown in FIG. 24, a portion of each contact member 221 extends into a respective one of the passages to engage memory contacts on a fiber optic connector 130. Another portion of each contact member 221 also extends out of the slot 210 to contact a circuit board 230. Portions of the main frame member 28 may define conductive paths that are configured to connect the media reading interfaces 220 of the adapter 102 with a master circuit board. The master circuit board may include or connect (e.g., over a network) to a processing unit that is configured to manage physical layer information obtained by the media reading interfaces.

Example adapters having media reading interfaces and example fiber optic connectors having suitable memory storage and memory contacts are shown in U.S. Pat. No. 8,690,593, the disclosure of which is hereby incorporated by reference.

Although in the foregoing description, terms such as "top", "bottom", "front", "back", "right", "left", "upper", and "lower were used for ease of description and illustration, no restriction is intended by such use of the terms. The telecommunications devices described herein can be used in any orientation, depending upon the desired application.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic telecommunications device comprising:
    a telecommunications frame; and
    a fiber optic module mounted to the telecommunications frame, the module movable between a retracted position and an extended position with respect to the frame along a sliding direction, the fiber optic module comprising:
        a main frame member defining a right side, a left side, and fiber optic connection locations for connecting cables to be routed through the telecommunications frame, wherein the fiber optic connection locations are provided in the form of an array of adapters defining a line which is generally parallel to the sliding direction of the module;
        a rack mount member coupled to each of the right side and the left side of the main frame member, each rack mount member configured for mounting the main frame member to the telecommunications frame;
        a center member positioned between the main frame member and the rack mount member at each of the right side and the left side of the main frame member, wherein each center member includes a radius limiter defining a curved surface for routing cables with bend radius protection from each of the right and left sides of the main frame member toward each rack mount member; and
        a slide assembly provided at each of the right side and the left side of the main frame member for slidably coupling the main frame member to each rack mount member between the extended position and the retracted position along the sliding direction;
    wherein the center member is slidable with respect to both the main frame members and the rack mount members and wherein each slide assembly is configured such that movement of the main frame member with respect to the rack mount members simultaneously moves the center members with respect to the rack mount members along the sliding direction, wherein each slide assembly at the right and left sides is configured such that the center members move at half the linear speed of the main frame member with respect to the rack mount members, each slide assembly including a rotational member that causes the simultaneous movement of the rack mount members, the center members, and the main frame member, the rotational member having an axis of rotation generally perpendicular to the sliding direction of the module, the rotational member being generally vertically aligned with the curved surface of the radius limiter of each of the center members.

2. A fiber optic telecommunications device according to claim 1, wherein the fiber optic adapters of the array are SC format adapters.

3. A fiber optic device according to claim 1, wherein the slide assembly includes a rack and pinion arrangement.

4. A fiber optic device according to claim 3, wherein the rotational member is defined by at least one gear of the rack and pinion arrangement of the slide assembly, the at least one gear being disposed on the center members and meshing with both a rack provided on each of the right and left sides of the main frame member and a rack provided on each of the rack mount members, wherein the racks provided on the main frame member, the racks provided on the rack mount members, and the at least one gear disposed on the center members are all generally vertically aligned with the curved surface of the radius limiters of the center members.

5. A fiber optic telecommunications device according to claim 1, wherein the telecommunications frame is mounted on a telecommunications rack.

6. A fiber optic telecommunications device according to claim 1, wherein a plurality of the fiber optic modules are mounted to the telecommunications frame.

7. A fiber optic telecommunications device according to claim 1, wherein each of the main frame member, the rack mount members, and the center members of the module includes portions with dovetail profiles for slidable coupling to each other.

8. A fiber optic telecommunications module comprising:
    a main frame member configured to be movably mounted to a piece of telecommunications equipment to be movable between a retracted position and an extended position along a sliding direction, the main frame member defining a right side, a left side, and fiber optic connection locations for connecting cables, wherein the fiber optic connection locations are provided in the form of an array of adapters defining a line which is generally parallel to the sliding direction of the module;
    a rack mount member coupled to each of the right side and the left side of the main frame member, each rack mount member configured for mounting the main frame member to the piece of telecommunications equipment;
    a center member positioned between the main frame member and the rack mount member at each of the right side and the left side of the main frame member, wherein each center member includes a radius limiter defining a curved surface for routing cables with bend radius protection from each of the right and left sides of the main frame member toward each rack mount member; and
    a slide assembly provided at each of the right side and the left side of the main frame member for slidably coupling the main frame member to each rack mount member between the extended position and the retracted position along the sliding direction;
    wherein the center member is slidable with respect to both the main frame members and the rack mount members and wherein each slide assembly is configured such that movement of the main frame member with respect to the rack mount members simultaneously moves the center members with respect to the rack mount members along the sliding direction, wherein each slide assembly at the right and left sides is configured such that the center members move at half the linear speed of the main frame member with respect to the rack mount members, each slide assembly including a rotational member that causes the simultaneous movement of the rack mount members, the center members, and the main frame member, the rotational member having an axis of rotation generally perpendicular to the sliding direction of the module, the rotational member being generally vertically aligned with the curved surface of the radius limiter of each of the center members.

9. A fiber optic telecommunications device according to claim 8, wherein the fiber optic adapters of the array are SC format adapters.

10. A fiber optic telecommunications module according to claim 8, wherein the fiber optic adapters of the array are LC format adapters.

11. A fiber optic device according to claim 8, wherein the slide assembly includes a rack and pinion arrangement.

12. A fiber optic device according to claim 11, wherein the rotational member is defined by at least one gear of the rack and pinion arrangement of the slide assembly, the at least one gear being disposed on the center members and meshing with both a rack provided on each of the right and left sides of the main frame member and a rack provided on each of the rack mount members, wherein the racks provided on the main frame member, the racks provided on the rack mount members, and the at least one gear disposed on the center members are all generally vertically aligned with the curved surface of the radius limiters of the center members.

13. A fiber optic telecommunications module according to claim 8, wherein each of the main frame member, the rack mount members, and the center members of the module includes portions with dovetail profiles for slidable coupling to each other.

* * * * *